United States Patent [19]

Domanick et al.

[11] 4,212,446
[45] Jul. 15, 1980

[54] UNIVERSAL MOUNTING PAD FOR ELECTRICAL TRANSFORMERS

[75] Inventors: Edward J. Domanick; Lewis B. Haskins, both of Littleton, Colo.

[73] Assignee: Johns-Manville, Denver, Colo.

[21] Appl. No.: 550,094

[22] Filed: Feb. 14, 1975

[51] Int. Cl.² ............................................. F16M 5/00
[52] U.S. Cl. ..................................... 248/678; 248/346
[58] Field of Search ................... 248/19, 23, 346, 350; 336/65

[56] References Cited

U.S. PATENT DOCUMENTS

| 1,811,881 | 6/1931 | Dina | 248/23 X |
|---|---|---|---|
| 1,840,741 | 1/1932 | Reid | 248/19 |
| 2,998,216 | 8/1961 | Hurd | 248/19 |
| 3,334,850 | 8/1967 | Jackson et al. | 248/19 |
| 3,458,132 | 7/1969 | Newton | 85/42 X |
| 3,511,191 | 5/1970 | Barry et al. | 108/51.1 |
| 3,713,620 | 1/1973 | Tkach | 248/19 |
| 3,841,032 | 10/1974 | Grannis | 248/19 X |
| 3,962,660 | 6/1976 | Duckett | 248/19 X |

OTHER PUBLICATIONS

"Polyethlyene Transformer Pad" by E. G. Larsen, published on Dec. 8, 1971.

Primary Examiner—J. Franklin Foss
Attorney, Agent, or Firm—Robert M. Krone; Joseph J. Kelly; James W. McClain

[57] ABSTRACT

A universal mounting pad for electrical transformers is described. Adjustable means comprising a plurality of recesses with channel irons therein engage movable bolts to which a variety of different size transformers can be attached. The pad is normally made of plastic. A plurality of collared earth augers hold the pad firmly in position.

5 Claims, 5 Drawing Figures

UNIVERSAL MOUNTING PAD FOR ELECTRICAL TRANSFORMERS

BACKGROUND OF THE INVENTION

The invention herein relates to mounting pads for electrical transformers. More particularly it relates to a "universal" mounting pad intended to serve as a suitable base for a wide variety of sizes of electrical transformers.

Electrical transformers in the size range of approximately 15-175 KVA rating are widely used for a myriad of industrial and commercial applications. They are conventionally encased in oil-filled housings which have dimensions generally of 3 to 4 feet in height and approximately 2 feet in width and depth and weigh several hundred pounds. They are commonly set up outdoors and are emplaced on mounting pads which rest directly on the ground and which contain an opening through which electrical cables are brought up from underground conduits for attachment to the transformers.

In the past such transformer mounting pads have been slabs made of concrete or of similar massive construction. These monolithic slabs have contained fixed anchoring means designed to accommodate only a single size of transformer. Since each different rating of transformer is of different physical dimensions and has a different spacing of mountings, a slab designed and constructed for one rating of transformer could not be used with any other rating.

In addition, the monolithic prior art slabs have been difficult to transport and handle because of their great weight. They are also easily damaged in handling by cracking, chipping or other destruction of the concrete block.

OBJECTS OF THE INVENTION

It is an object of the present invention to provide a light weight and easily handled mounting pad for electrical transformers.

It is also an object of this invention to provide a single device adaptable to use with a variety of sizes and ratings of electrical transformers without modification.

BRIEF SUMMARY OF THE INVENTION

The invention herein is a universal mounting pad for anchoring any of several different sizes of electrical transformers. The pad comprises a generally flat deck having a top surface, two ends and two transverse sides with ground engaging support means extending downwardly from the deck. An opening extends through the deck adjacent one of the ends and disposed along the center line between the transverse sides. There are two longitudinal recesses in the deck extending outwardly from the opening with each recess disposed parallel to the ends. Each of the recesses has a flat bottom surface recessed below the top surface of the deck by a predetermined depth. A channel mounting member is attached to the bottom surface of the recess with the channel mounting member having a depth generally equal to the depth of the recess and a longitudinal axis substantially aligned with the longitudinal axis of the recess. The open portion of the channel mounting member is on the uppermost surface of the member. There are a plurality of additional recesses in the deck, each recess having a bottom surface depressed below the level of the top surface of the deck. Anchoring means cooperate with these additional recesses to anchor the pad to the underlying ground to substantially prevent lateral and/or vertical motion of the pad. Other features to be found in various embodiments of the pad include a series of interconnected ribs forming the ground engaging support means and construction of the pad from plastic, preferably a structural foam plastic.

DETAILED DESCRIPTION AND PREFERRED EMBODIMENTS

Figure 2:
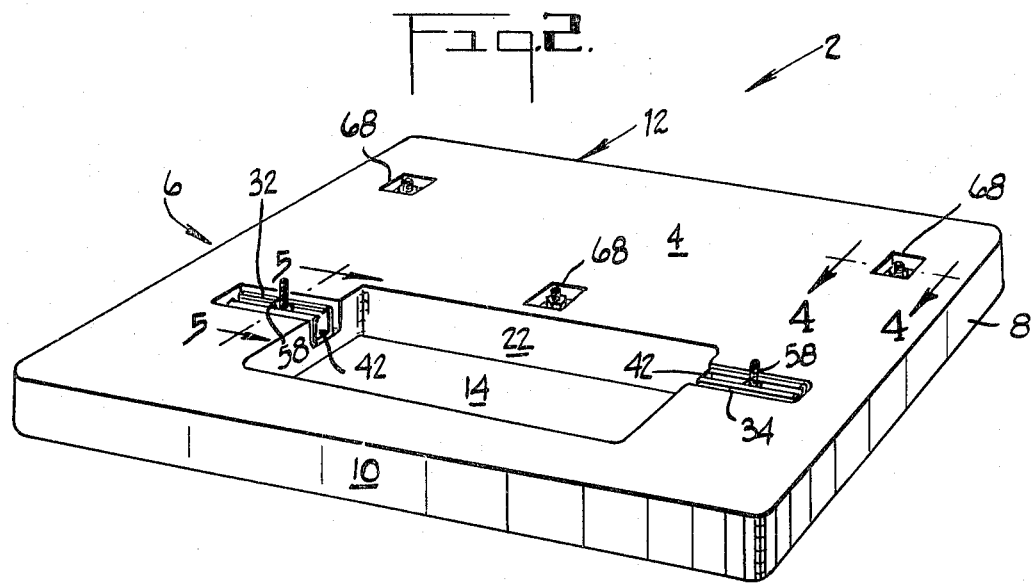
FIG. 2 is a top perspective view of the pad of the present invention.
Figure 3:
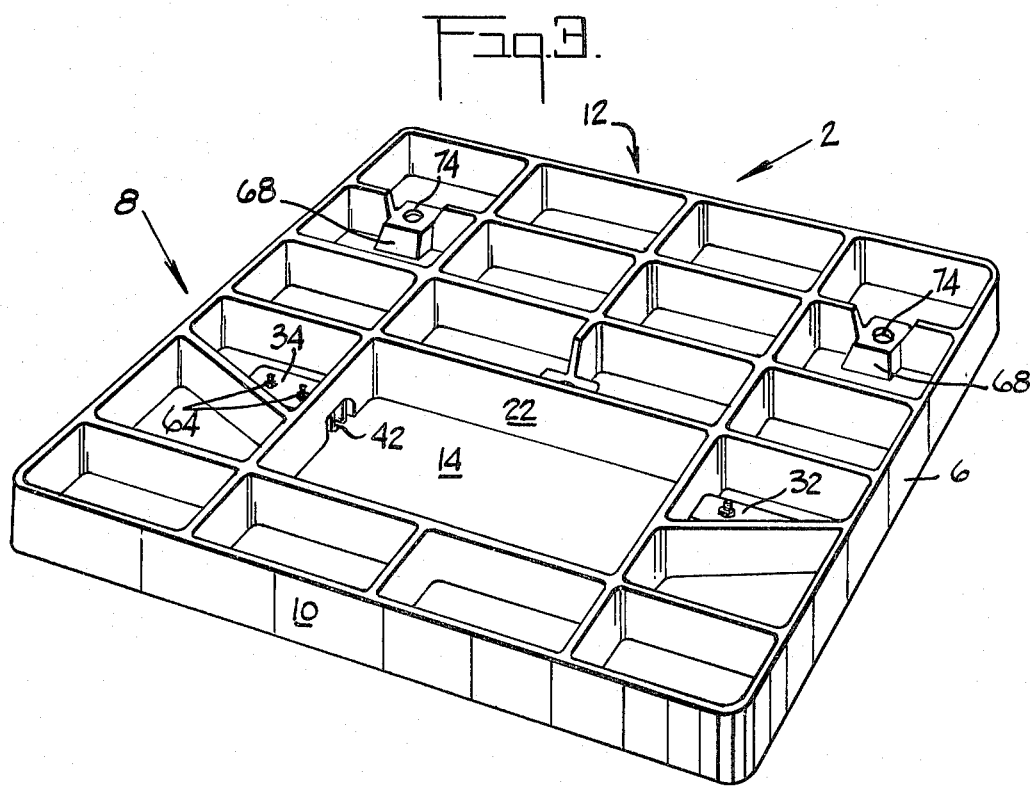
FIG. 3 is a bottom perspective view of the pad of the present invention.

The article of this invention is best understood by reference to the drawings, with particular reference to FIG. 2 showing the top of the pad and the FIG. 3 showing the underside. The mounting pad (generally designated 2) consists of a flat deck 4, transverse sides 6 and 8 and ends 10 and 12. The shape of the pad is commonly rectangular or square, although other shapes could be used if desired.

Located adjacent to end 10 is opening 14 which penetrates entirely through the pad. The opening 14 is shown as rectangular with the longer sides of the rectangle paralleling end 10 and the opening lying essentially equidistant between sides 6 and 8. Other shapes may also be used. The opening 14 normally lies entirely within that half of the pad bordered by end 10.

Figure 1:
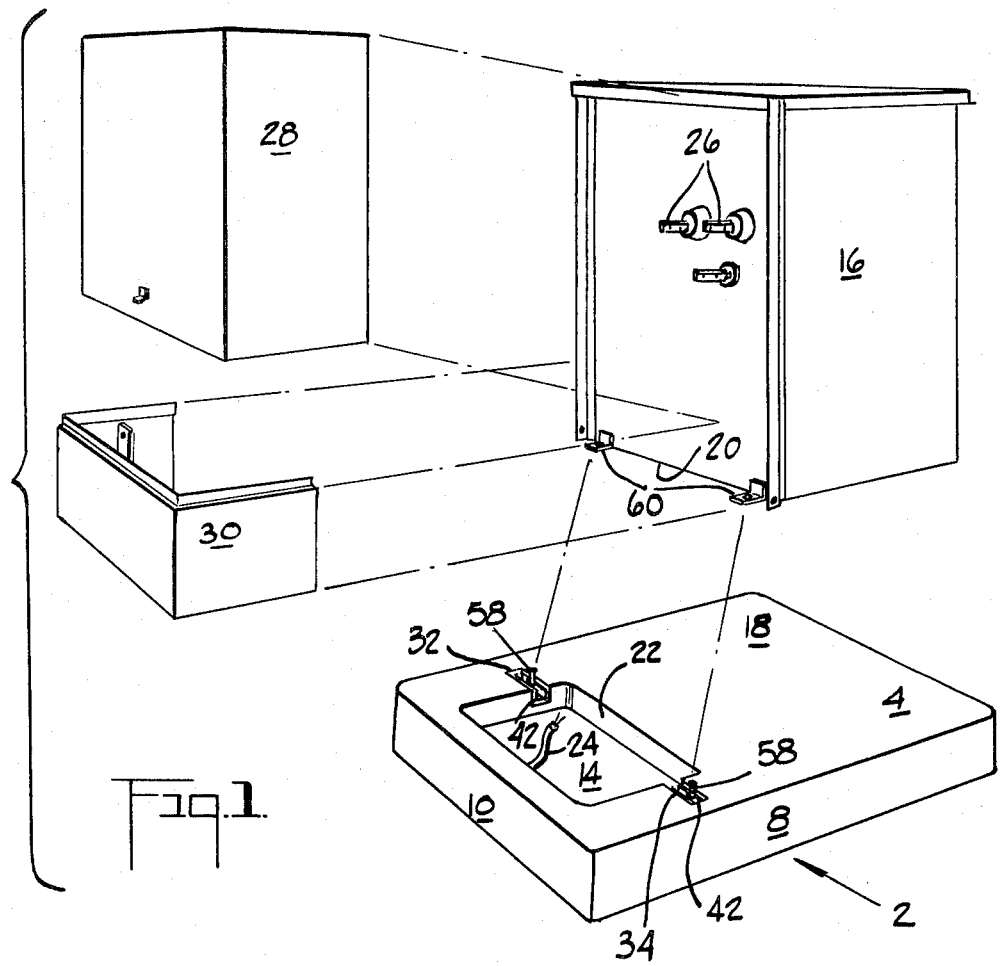
FIG. 1 is an exploded perspective view illustrating the mounting of an electrical transformer upon the universal pad of the present invention.

To this point the mounting pad of the present invention follows the structures of the prior art. Mounting pads generally function as shown in FIG. 1 wherein a transformer encased in an oil-filled housing 16 rests upon that portion of surface 4 designated 18. In conventional practice the lower front edge 20 of housing 16 lies parallel and adjacent to the inward edge 22 of opening 14. It is normally set back slightly from edge 22. Two or more bolts (not shown) adjacent to edge 22, imbedded in the concrete of portion 18 and protruding above the surface 4 engage some sort of receiving means on or near front edge 20 to secure the transformer to the conventional pad. Electrical lines such as 24 are then brought up from an underground conduit terminating directly below opening 14, passed through opening 14 and connected with the various terminals such as 26 on the front face of the transformer.

Once the transformer is anchored in place and the proper electrical connections are completed, removable coverings 28 and 30 are attached to protect the electrical connections and the opening 14 to the underground conduit from inclement weather, dirt, human or animal contact, etc.

Figures 4, 5:
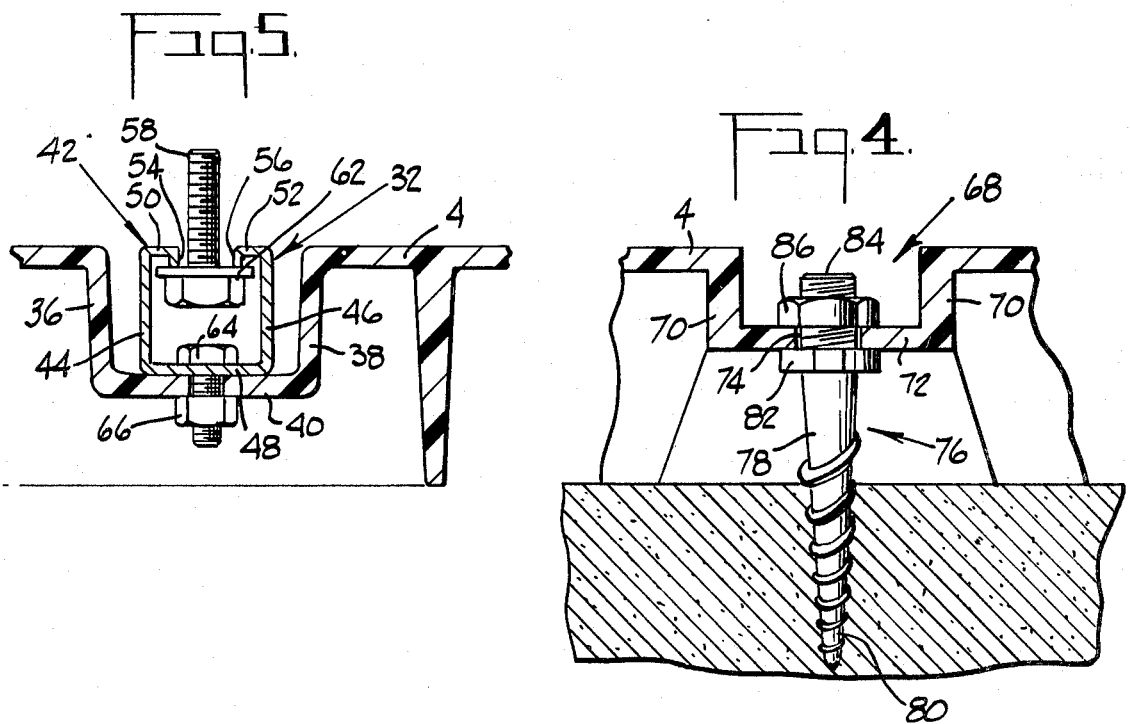
FIG. 4 is a partial sectional view taken upon line 4—4 of FIG. 2.
FIG. 5 is a partial sectional view taken upon line 5—5 of FIG. 2.

The pad of the present invention represents a major increase in versatility of transformer mounting pads. Rather than having two fixed bolts rigidly encased in the standard concrete slab, the pad of the present invention incorporates an adjustable feature which permits the pad to be used for the anchoring of any of a wide variety of different transformer sizes. The adjustable feature is embodied in the two recesses 32 and 34 extending laterally from the central opening 14. These are illustrated in cross section in FIG. 5. The recess extends downwardly from the surface of the deck 4 part way to the bottom of the pad. As illustrated in FIG. 5 each recess comprises sidewalls 36 and 38 and bottom 40. Centered within the recess is a channel iron 42 which is generally U-shaped having sidewalls 44 and 46 in bottom 48. The vertical height of the channel iron 42 is substantially equal to the depth of the recess, although it may be slightly higher or lower depending on required bolt clearances and avoidance of interference with the front edge 20 of the transformer housing. The channel iron 42 has two flanges 50 and 52 extending inwardly from the top of respective side edges 44 and 46.

These flanges may be terminated by lifts 54 and 56. The purpose of the flanges (and lips if present) is to restrain bolt 58 which is vertically retained in the channel and extends upwardly above the level of the surface of deck 4. Each bolt 58 engages a corresponding hole in the front of transformer housing 16. The particular configuration of the receiving holes in housing 16 will vary according to the particular transformer to be mounted; it is common for transformers manufactured by different companies to have slightly different configurations of such receiving holes. For the purpose of this invention such receiving holes are illustrated by tabs 60 extending outwardly from the front of housing 16. The bolts 58 extend upwardly through the holes in tabs 60 and are secured thereto by conventional nuts and washers (preferably lock washers).

The universal and adjustable feature of this invention will immediately be recognized as the capacity to place bolt 58 at any point along the length of channel iron 42. Thus the smaller transformers of lower rating will have the bolts placed at the inward portions of channel irons 42 while the larger and higher voltage transformers with wider housings will have the bolts placed in the outward portions of channel irons 42. In addition to one size of pad thus being adaptable to many sizes of transformers, this feature also allows for the rapid and easy replacement of one size of transformer with a larger or smaller size, simply by moving the mounting bolts.

The mounting bolts are slid into the channel from the open inward ends. They may also, if desired, have a washer or other small mounting plate such as 62 mounted between the bolt head and the flanges or lips of the channel iron for added stiffness.

The channel irons 42 may be secured to the recesses 32 and 34 by conventional means, such as nuts and bolts 64 and 66 as shown in FIG. 5. Other means of fastening include riveting or use recesses 32 and 34 by any conventional means, such as nuts and bolts 64 and 66 as shown in FIG. 5. Other means of fastening include riveting or use of adhesives. Securement to sides 36 and 38 may also be possible but this is far less convenient and may present substantial clearance problems for the bolts 58; it is therefore not preferred.

The pad of the present invention is of a lightweight non-slab structure as best illustrated in FIG. 3. The underside of the pad is comprised of a series of interconnected ribs which together form the ground engaging support means. The particular configuration of ribs shown in FIG. 3 is one which is considered to be particularly effective, but those skilled in the art will immediately recognize that other rib configurations are equally suitable.

The presence of the ribbed structure requires the use of anchoring means to prevent the loads concentrated along the rib edges from forcing the pad into the ground. The anchoring means also serve the dual purpose of holding the lightweight pad against vertical and/or lateral shifting. Referring to FIGS. 2 and 3, recesses 68 are shown in the deck 4. Three recesses set in a triangular pattern are illustrated but other configurations utilizing more or fewer recesses are also satisfactory. As illustrated in FIG. 3 and in cross section in FIG. 4, each recess 68 is composed of sidewalls 70 and bottom 72. The depth of recess 68 must be such that the upper portion of the anchoring means do not extend above the level of the surface of deck 4 in order to avoid interference with the under side of the transformer. Centrally located in each of the recesses 68 is a hole 74 through which anchoring means (generally designated 76) is inserted. Anchoring means 76 comprises a vertical shaft 78 at the lower end of which is an earth auger structure 80 which is illustrated as a helical screw thread. Other configurations such as annular discs may also be used, particularly if the anchoring means are to be inserted in the ground (or other substrate) and then have earth or other filler packed around them, rather than being driven into the ground in the manner of an auger. At the upper end of shaft 78 is collar 82 which engages the underside of bottom 72 of of recess 68. Anchoring means 76 will be inserted into the ground to a predetermined depth such that the top of collar 82 will be at a height equal to the distance from the top surface of the ground to the bottom surface 72 so that the pad will normally rest upon the ground but will not move downward because of the engagement with collar 82. Collar 82 may be an annular flange or may be in a polygonal flange. For instance, where the anchoring means are to be driven into the ground prior to implacement of the pad, collar 82 may be hexagonal or have opposite flattened sides to engage conventional wrenchs or socket drivers. The diameter of collar 82 will be substantially greater than the diameter of hole 74 to prevent a downward motion of the pad. The upper end 84 of shaft 78 extends upwardly through hole 74 into recess 68 and is threaded to engage nut 86. It will thus be seen that in operation several anchoring means 76 are first driven into the ground in a pattern predetermined by the location of recesses 68 in the particular pad to be mounted. After the anchoring means 76 are firmly seated in the ground, the pad 2 is placed over them such that the shafts extend upward through holes 74 in each of the recesses 68 and the pad rests upon the ground with the bottoms 72 of the recesses 68 engaging the collars 82. Thereafter nuts 86 are tightened down on the shafts 84 to lock the pad in place and prevent vertical or lateral motion of the pad. With the pad firmly in place, the transformer is placed on portion 18 of surface 4 with the bolt engaging holes (as in tabs 60) aligned with recesses 32 and 34 and channels 42 such that bolts 58 can be used to lock the transformer in place. Thereafter the electrical connections are made and the coverings 28 and 30 are put in place to complete the assembly.

The pads of the present invention may be made of any convenient light weight material. It is contemplated in the preferred embodiment that the pads be made of plastic, preferably a structural foam polyurethane, high density polyethylene or similar material. The various sizes of ribs and pads in general may be determined from common dimensions and standard structural information pertaining to plastic manufacture. Alternatively, materials such as molded concrete or metal may be used but since neither has the advantages of light weight and resistance to weathering, corrosion and breakage that plastic has, the latter is preferred.

The channel member and anchoring means will normally be made out of metal, commonly a weather-resistant steel. Particularly preferred for the channel irons are lengths of a commercial steel structure available under the trade name "Unistrut".

We claim:

1. A universal mounting pad for anchoring any of several different sizes of electrical transformers, which comprises a generally flat deck having a top surface, two ends and two transverse sides;

ground engaging support means extending downwardly from said deck;

an opening extending through said deck adjacent one of said ends and disposed between said transverse sides;

two oppositely disposed recesses in said deck extending outwardly from said hole, each recess disposed parallel to said ends;

each of said recesses having a flat bottom surface recessed below said top surface of said deck by a predetermined depth;

a channel mounting member secured within each of said recesses, said member having a depth substantially equal to the depth of said recess and a longitudinal axis substantially aligned with the longitudinal axis of said recess, with the open portion of said channel mounting member being on the uppermost surface of said member and adapted to retain therein connecting means which attach the transformer to said pad;

a plurality of additional recesses in said deck, each recess having a bottom surface depressed below the level of said top surface of said deck; and anchoring means cooperating with said additional recesses to anchor said pad to the underlying ground to substantially prevent the movement of said pad in lateral and vertical planes, said anchoring means comprises a shaft having at one end thereof earth engaging means and near the other end thereof a radial collar which engages the bottom of the additional recess and screw threads for engagement with a nut.

2. The pad of claim 1 wherein said ground engaging means comprises a series of ribs.

3. The pad of claim 1 wherein said channel mounting member has a U-shaped cross-section with flanges extending inwardly from the top of each side of the "U".

4. The pad of claim 1 wherein said earth engaging means comprises a helical auger thread.

5. The pad of claim 1 wherein said deck and said ground engaging means are composed of plastic.

* * * * *